(12) United States Patent
Mitsugi et al.

(10) Patent No.: US 9,064,293 B2
(45) Date of Patent: Jun. 23, 2015

(54) VEHICLE SURROUNDINGS MONITORING DEVICE

(75) Inventors: Tatsuya Mitsugi, Tokyo (JP); Satoru Inoue, Tokyo (JP); Ryotaro Suzuki, Tokyo (JP); Hirokazu Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 402 days.

(21) Appl. No.: 13/580,410

(22) PCT Filed: Jun. 15, 2010

(86) PCT No.: PCT/JP2010/003966
§ 371 (c)(1),
(2), (4) Date: Aug. 22, 2012

(87) PCT Pub. No.: WO2011/158285
PCT Pub. Date: Dec. 22, 2011

(65) Prior Publication Data
US 2012/0320211 A1  Dec. 20, 2012

(51) Int. Cl.
*G06T 3/00* (2006.01)
*G06K 9/00* (2006.01)

(52) U.S. Cl.
CPC .............. *G06T 3/00* (2013.01); *B60R 2300/602* (2013.01); *G06K 9/00805* (2013.01); *B60R 2300/301* (2013.01)

(58) Field of Classification Search
CPC ................ B60R 1/00; B60R 2300/607; B60R 2300/301; B60R 2300/305; B60R 2300/306; B60R 2300/802; H04N 5/23212; G06T 7/004; B60Q 1/484; G01S 17/1936; G01S 15/931; G01S 2013/9332; G01S 15/93; G06K 9/00805

USPC ..................... 348/148; 340/435, 436; 382/103
See application file for complete search history.

(56) References Cited

U.S. PATENT DOCUMENTS

| | | | |
|---|---|---|---|
| 6,535,114 B1 | 3/2003 | Suzuki et al. | |
| 6,840,342 B1 * | 1/2005 | Hahn | 180/169 |
| 7,149,608 B2 * | 12/2006 | Itoh et al. | 701/1 |
| 7,176,959 B2 * | 2/2007 | Sato et al. | 348/148 |
| 7,307,655 B1 | 12/2007 | Okamoto et al. | |
| 7,356,408 B2 * | 4/2008 | Tsuchiya et al. | 701/538 |
| 7,834,905 B2 * | 11/2010 | Hahn et al. | 348/148 |

(Continued)

FOREIGN PATENT DOCUMENTS

EP   1 462 762 A1   9/2004
JP   3286306 B2    5/2002

(Continued)

*Primary Examiner* — Brian Yenke
(74) *Attorney, Agent, or Firm* — Birch, Stewart, Kolasch & Birch, LLP

(57) ABSTRACT

A vehicle surroundings monitoring device carries out a position mapping process of expressing a positional relationship in the detection ranges of distance sensors 2 for detecting an obstacle 100 by coordinates on a camera image captured by a camera unit 3 having an image capture range in the surroundings of a vehicle, derives transformation parameters used for carrying out a mapping transformation in such a way that the obstacle detected by the distance sensors 2 is placed at a predetermined position on the camera image on which the position mapping process has been carried out, and carries out an image transformation on the camera image by using the transformation parameters in such a way that the obstacle is placed at the predetermined position.

16 Claims, 16 Drawing Sheets

(56) References Cited

U.S. PATENT DOCUMENTS

| | | | |
|---|---|---|---|
| 7,834,929 B2* | 11/2010 | Okawara | 348/347 |
| 7,894,631 B2* | 2/2011 | Kakinami | 382/103 |
| 8,077,203 B2* | 12/2011 | Abe | 348/148 |
| 8,396,653 B2* | 3/2013 | Rottner et al. | 701/300 |
| 8,446,471 B2* | 5/2013 | Wu et al. | 348/148 |
| 8,451,369 B2* | 5/2013 | Okawara | 348/345 |
| 8,817,099 B2* | 8/2014 | Longobardi | 348/148 |
| 8,854,463 B2* | 10/2014 | Imamura | 348/148 |
| 2003/0021490 A1* | 1/2003 | Okamoto et al. | 382/284 |
| 2003/0179293 A1* | 9/2003 | Oizumi | 348/148 |
| 2004/0090314 A1* | 5/2004 | Iwamoto | 340/425.5 |
| 2004/0184638 A1* | 9/2004 | Nobori et al. | 382/104 |
| 2005/0001715 A1* | 1/2005 | Itoh et al. | 340/435 |
| 2005/0004762 A1 | 1/2005 | Takahama et al. | |
| 2005/0231341 A1* | 10/2005 | Shimizu | 340/436 |
| 2006/0119472 A1 | 6/2006 | Tsuboi | |
| 2008/0187047 A1* | 8/2008 | Stephan et al. | 375/240.16 |
| 2008/0231702 A1* | 9/2008 | Matsumoto et al. | 348/148 |
| 2009/0059006 A1* | 3/2009 | Hattori et al. | 348/148 |
| 2009/0073263 A1 | 3/2009 | Harada et al. | |
| 2009/0121851 A1 | 5/2009 | Abe | |
| 2009/0122140 A1* | 5/2009 | Imamura | 348/148 |
| 2010/0220189 A1 | 9/2010 | Yanagi | |
| 2012/0327239 A1* | 12/2012 | Inoue et al. | 348/148 |

FOREIGN PATENT DOCUMENTS

| | | |
|---|---|---|
| JP | 2004-64150 A | 2/2004 |
| JP | 2005-324593 A | 11/2005 |
| JP | 2006-178667 A | 7/2006 |
| JP | 2009-71790 A | 4/2009 |
| JP | 2009-118416 A | 5/2009 |
| JP | 3156161 U | 12/2009 |
| WO | WO 2007/015446 A1 | 2/2007 |

* cited by examiner (a)

(b)

(a)　　　　　　　　　　(b)

(a)

(b)

(a)

(b)

VEHICLE SURROUNDINGS MONITORING DEVICE

FIELD OF THE INVENTION

The present invention relates to a vehicle surroundings monitoring device which monitors the surroundings of a vehicle by using a wide angle camera for capturing the surroundings of the vehicle and a plurality of distance sensors each for detecting the distance to an object to be detected.

BACKGROUND OF THE INVENTION

Devices disclosed by patent reference 1 and patent reference 2 have a detection object area in the surroundings of a vehicle which is set up for an obstacle detecting sensor with respect to the vehicle, and perform a visual field transformation on a camera image which is acquired by capturing the detection object area according to the distance to an obstacle which is detected in the detection object area to change the size of the angle of depression of the camera image, thereby making it easy for the user to keep track of the obstacle.

A problem with the conventional technologies represented by above-mentioned patent references 1 and 2 is, however, that because the viewpoint transformation is carried out on the camera image according to the distance to the obstacle which is detected by the obstacle detecting sensor, the viewpoint transformation is carried out even though no obstacle is existing in the camera image. A further problem is that no appropriate camera image which makes it easy for the user to keep track of the obstacle can be provided only using the distance to the obstacle.

The present invention is made in order to solve the above-mentioned problems, and it is therefore an object of the present invention to provide a vehicle surroundings monitoring device which can provide a camera image which makes it easy for the user to keep track of an obstacle.

RELATED ART DOCUMENT

Patent Reference

Patent reference 1: Japanese Unexamined Patent Application Publication No. 2005-324593
Patent reference 2: Japanese Unexamined Patent Application Publication No. 2009-71790

SUMMARY OF THE INVENTION

In accordance with the present invention, there is provided a vehicle surroundings monitoring device including: a position mapping unit for carrying out a position mapping process of expressing a positional relationship in a detection range in surroundings of a vehicle of a detecting unit for detecting an obstacle by coordinates on a camera image captured by a camera unit having an image capture range in the surroundings of the vehicle; a mapping transformation unit for deriving transformation parameters used for carrying out a mapping transformation in such a way that the obstacle detected by the detecting unit is placed at a predetermined position on the camera image on which the position mapping process has been carried out by the position mapping unit; and a camera image transformation unit for carrying out an image transformation on the camera image by using the transformation parameters acquired by the mapping transformation unit in such a way that the obstacle is placed at the predetermined position.

In accordance with the present invention, the vehicle surroundings monitoring device carries out the position mapping process of expressing the positional relationship in the detection range of the detecting unit for detecting an obstacle by coordinates on the camera image captured by the camera unit having an image capture range in the surroundings of the vehicle, derives the transformation parameters used for carrying out a mapping transformation in such a way that the obstacle detected by the detecting unit is placed at the predetermined position on the camera image on which the position mapping process has been carried out, and carries out the image transformation on the camera image by using the transformation parameters in such a way that the obstacle is placed at the predetermined position. Because the vehicle surroundings monitoring device is constructed as above, the vehicle surroundings monitoring device provides an advantage of being able to provide a camera image which makes it easy for the user to keep track of an obstacle.

EMBODIMENTS OF THE INVENTION

Hereafter, in order to explain this invention in greater detail, the preferred embodiments of the present invention will be described with reference to the accompanying drawings.

Embodiment 1

In accordance with the present invention, there is provided a technique of using a single camera based on a projection method of a so-called fish-eye lens having an angle of view of 180 degrees or more in a horizontal direction in the visual field (angle of view) of the camera to provide a camera image which makes it easy for a user to keep track of an obstacle according to vector information about a vector to the obstacle which is acquired from distance sensors without causing the user to perform any complicated operation, thereby contributing to safety.

Figure 1:
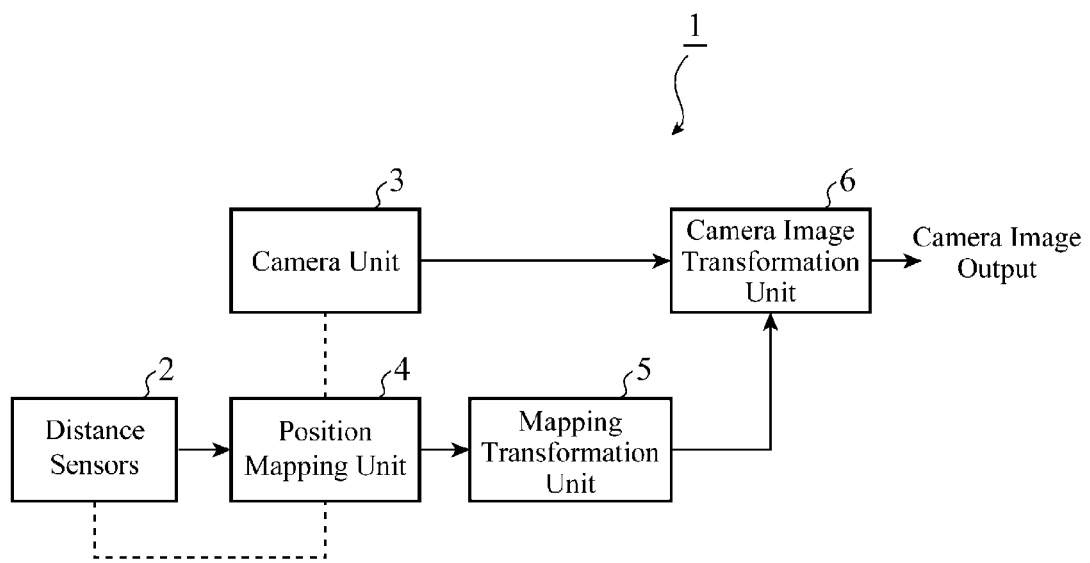
FIG. 1 is a block diagram schematically showing the structure of a vehicle surroundings monitoring device in accordance with Embodiment 1 of the present invention.

FIG. 1 is a block diagram schematically showing the structure of a vehicle surroundings monitoring device in accordance with Embodiment 1 of the present invention. Referring to FIG. 1, the vehicle surroundings monitoring device 1 in accordance with Embodiment 1 is provided with distance sensors 2, a camera unit 3, a position mapping unit 4, a mapping transformation unit 5, and a camera image transformation unit 6. Each distance sensor (detecting unit) 2 applies a detection wave to the surroundings of a vehicle to measure a vector between the vehicle and an obstacle (a distance and a direction) on the basis of a reflection signal from the obstacle. As the detection wave, an ultrasonic wave, a laser beam, a radio wave, or the like can be provided. Further, each distance sensor 2 has a limited range in which the detection wave therefrom reaches and the distance sensor can detect an obstacle. This range is referred to as an obstacle detection range covered by each distance sensor 2 (simply referred to as an obstacle detection range from here on). The camera unit 3 has a camera (not shown) as an image capturing unit for capturing an image of an area surrounding the vehicle (e.g. an area behind the vehicle), and sends the camera image captured by the camera to the position mapping unit 4.

The position mapping unit 4 is a component for carrying out a position mapping process of expressing a positional relationship in the obstacle detection ranges of the distance sensors 2 by coordinates on the camera image captured by the camera unit 3 (i.e. an image corresponding to an image capture range). Embodiment 1 is based on the premise that the image capture range of the camera unit 3 is wider than the obstacle detection ranges of the distance sensors 2, and all the obstacle detection ranges are included in the camera image. The mapping transformation unit 5 is a component for carrying out a mapping transformation in such a way that the position (vector) of an obstacle on which the position mapping process has been carried out by the position mapping unit 4 is a predetermined position on the camera image. For example, the mapping transformation unit 5 derives transformation parameters for the image transformation in such a way that an obstacle in the camera image is positioned close to a side or an angle of the screen of the camera image. The camera image transformation unit 6 is a component of carrying out an image transformation on the camera image by using the transformation parameters derived by the mapping transformation unit 5 to acquire a camera image output. As the image transformation, enlarging or reducing, a bird's-eye view image transformation, a change of the output size in an arbitrary direction, a reference point movement, and a screen mode change can be provided. The details of these examples of the image transformation will be mentioned later.

Figure 2:
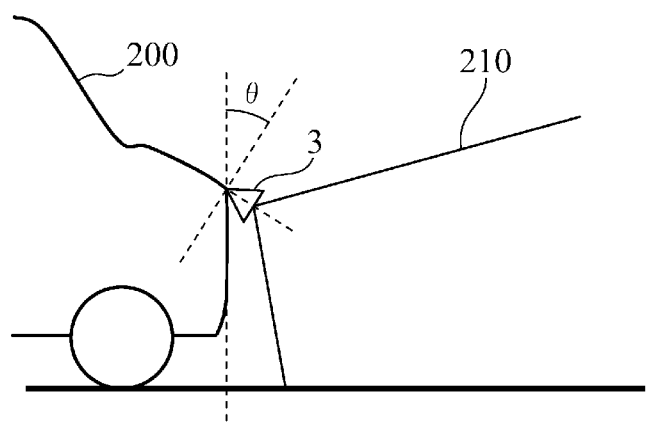
FIG. 2 is a view showing a form in which a camera unit is mounted to a vehicle.
Figure 2:
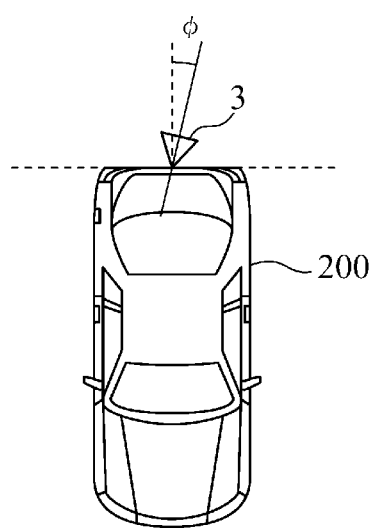

FIG. 2 is a view showing the form in which the camera unit is mounted to the vehicle, FIG. 2(a) is a side view and FIG. 2(b) is a top plan view. An object on the camera image is expressed in a different shape according to the angle to the object with respect to the direction of the camera in the camera unit 3. More specifically, in a case in which the distortion of the camera lens and the projective transformation method are neglected, a square object is expressed as a square on the camera image when the direction of the camera and the object are just opposite to each other. In contrast, in a case in which a rear camera (camera unit 3) mounted in a rear portion of the vehicle 200, as shown in FIGS. 2(a) and 2(b), is positioned with a horizontal mounting angle φ of 0 degrees and a vertical mounting angle θ which is an arbitrary angle, a square object existing on a road surface in the image capture range 210 of the camera unit 3 is outputted as a trapezoid in the camera image (refer to a screen B2 of FIG. 12 which will be mentioned later). Further, in a case in which the rear camera is positioned with a horizontal mounting angle φ which is an arbitrary angle, a square object existing on a road surface in the image capture range 210 of the camera unit 3 is outputted as a quadrilateral (square or rectangle) in the camera image (refer to a screen B1 of FIG. 12 which will be mentioned later). In this embodiment, for the sake of simplicity, it is assumed that the horizontal mounting angle φ is 0 degrees.

Figure 3:
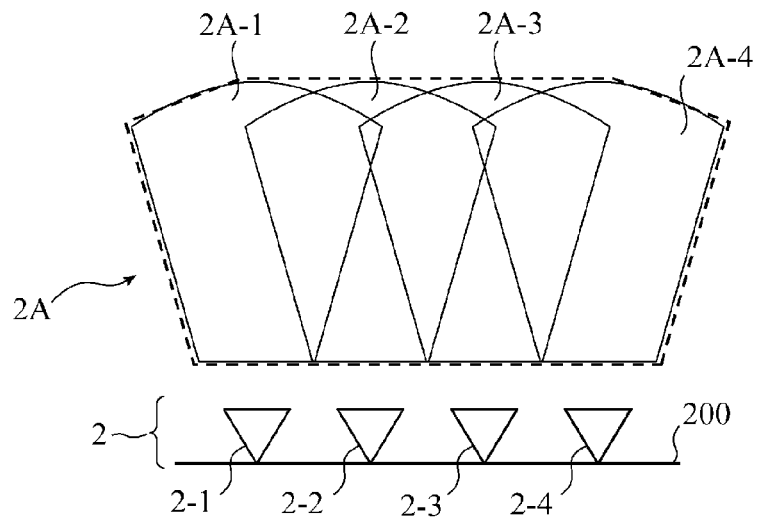
FIG. 3 is a view showing an example of the obstacle detection ranges of distance sensors.

FIG. 3 is a view showing an example of the obstacle detection range of each distance sensor. In this figure, a plurality of distance sensors 2 (2-1 to 2-4) mounted in the rear portion of the vehicle 200 are shown. As shown in FIG. 3, the obstacle detection ranges 2A (2A-1 to 2A-4) of the distance sensors 2 (2-1 to 2-4) are formed in such a way that, for example, a detection wave emitted from each distance sensor 2 propagates and spreads from an irradiation part thereof towards a specific range radiately extending in a direction going away from the vehicle 200. By preparing the plurality of distance sensors 2 (the distance sensors 2-1 to 2-4) each emitting a detection wave in this way, the vehicle surroundings monitoring device can acquire a vector of an obstacle (a distance and a direction) in two dimensions which satisfies a direction of the width of the vehicle from both the distance from the vehicle 200 to the obstacle in a direction of the length of the vehicle 200 and the position of the obstacle in the direction of the width of the vehicle.

Figure 4:
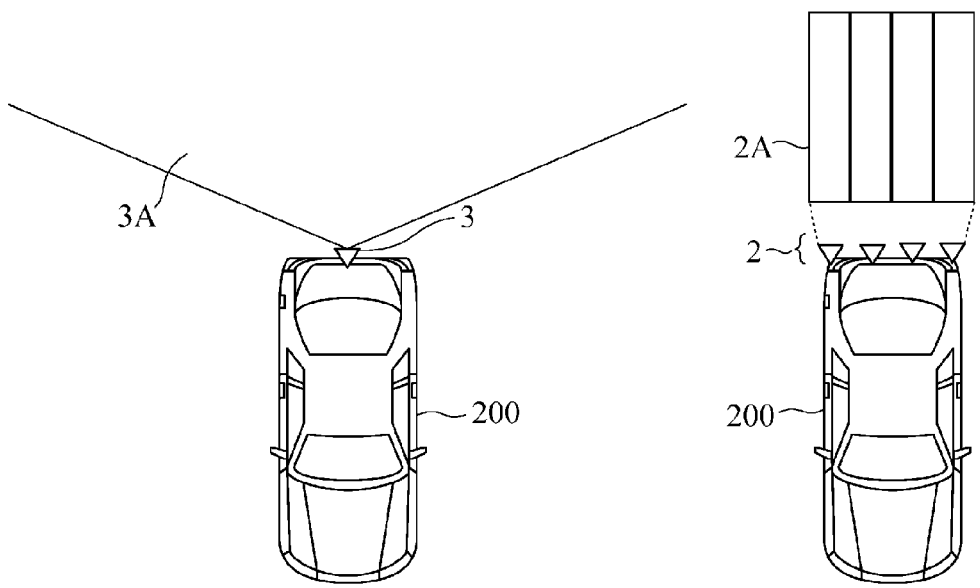
FIG. 4 is a view showing an example of the image capture range of the camera unit and the obstacle detection ranges of the distance sensors.
Figure 5:
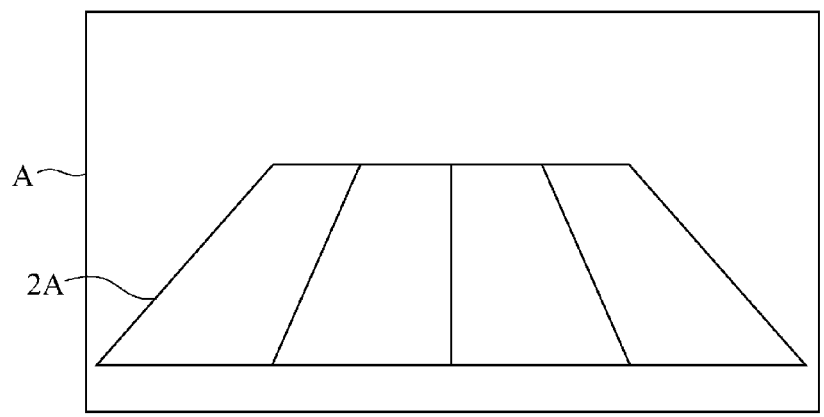
FIG. 5 is a view showing a camera image of the obstacle detection ranges of the distance sensors captured by the camera unit shown in FIG. 4(a)

FIG. 4 is a view showing an example of the image capture range of the camera unit, and the obstacle detection ranges of the distance sensors, FIG. 4(*a*) shows a top plan view of the image capture range 3A of the camera unit 3 which is the rear camera of the vehicle 200, and FIG. 4(*b*) shows a top plan view of the obstacle detection ranges 2A of the distance sensors 2 mounted in the rear portion of the vehicle 200. Further, FIG. 5 is a view showing a camera image A of the obstacle detection ranges 2A of the distance sensors 2 which is captured by the camera unit 3 shown in FIG. 4(*a*). In FIGS. 4 and 5, for the sake of simplicity, a case in which the output of the detection wave is adjusted in such a way that the obstacle detection range is shaped into a rectangle when viewed from left and right lateral sides or upper and lower sides is shown.

As shown in FIGS. 4 and 5, in a case in which the camera unit 3 mounted in the rear portion of the vehicle 200 is a rear camera having a wide angle of view and the plurality of distance sensors 2 are mounted in the rear portion of the vehicle 200, the camera unit 3 has a large horizontal angle of view and has an image capture range 3A including all the obstacle detection ranges 2A of the distance sensors 2 in the direction of the width of the vehicle. The obstacle detection ranges 2A are uniquely determined by the selection of the distance sensors 2.

The entire obstacle detection ranges 2A with respect to the camera image captured by the camera unit 3 having the image capture range 3A are expressed as a trapezoid, as shown in FIG. 5. This expression as a trapezoid can be derived from calculation based on the distortion resulting from the lens of the camera, the projection method, the mounting position of the camera, and the angle of view of the camera. As a result, because the obstacle detection ranges 2A are mapped onto coordinates on the camera image by the position mapping unit 4, the position of an obstacle acquired by the distance sensors 2 is expressed as the coordinates of the corresponding position on the imaging screen (on the camera image), so that the position of the obstacle can be expressed as the coordinates on the captured image in a unified way.

Figure 6:
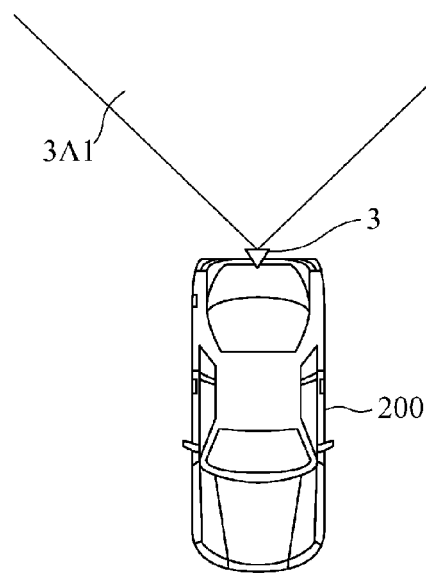
FIG. 6 is a view showing another example of the image capture range of the camera unit and the obstacle detection ranges of the distance sensors.
Figure 6:
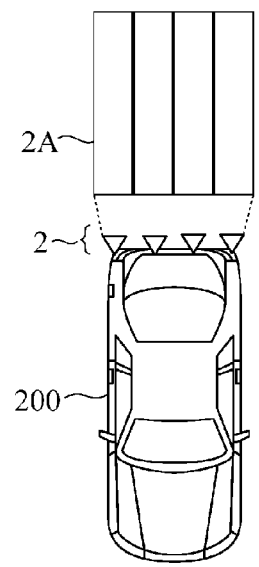
Figure 7:
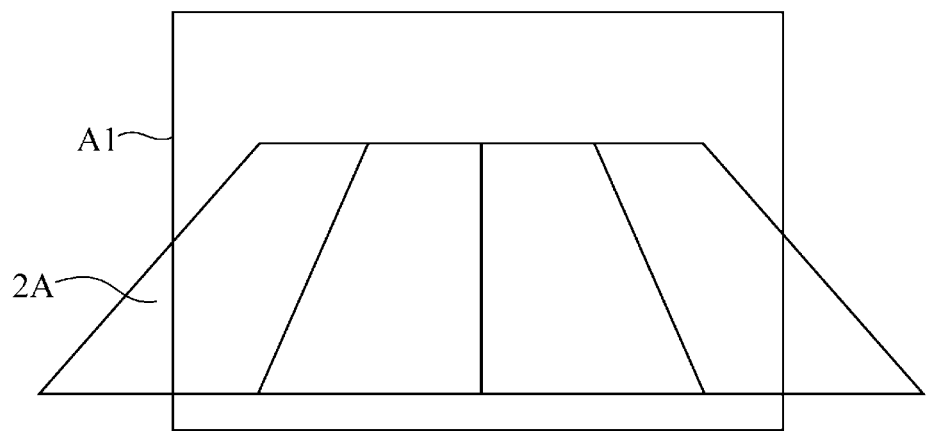
FIG. 7 is a view showing a camera image of the obstacle detection ranges of the distance sensors captured by the camera unit shown in FIG. 6(a)

FIG. 6 is a view showing another example of the image capture range of the camera unit, and the obstacle detection ranges of the distance sensors, FIG. 6(*a*) shows a top plan view of the image capture range 3A1 of the camera unit 3 which is a rear camera of the vehicle 200, and FIG. 6(*b*) shows a top plan view of the obstacle detection ranges 2A of the distance sensors 2 mounted in the rear portion of the vehicle 200. Further, FIG. 7 is a view showing a camera image A1 of the obstacle detection ranges 2A of the distance sensors 2 which is captured by the camera unit 3 shown in FIG. 6(*a*). Also in FIGS. 6 and 7, for the sake of simplicity, a case in which the output of the detection wave is adjusted in such a way that the obstacle detection range is shaped into a rectangle when viewed from left and right lateral sides or upper and lower sides is shown.

In the example shown in FIGS. 6 and 7, the camera unit 3 mounted in the rear portion of the vehicle 200 has a narrow horizontal angle of view, and has an image capture range 3A1 which does not include a part of the obstacle detection ranges 2A of the distance sensor 2 in a direction of the width of the vehicle. The obstacle detection ranges 2A are the same as those shown in FIG. 4.

While the entire obstacle detection ranges 2A with respect to the camera image captured by the camera unit 3 having the image capture range 3A1 are expressed as a trapezoid, as shown in FIG. 7, like in the example shown in FIG. 5, the obstacle detection ranges 2A partially extend off the image capture range 3A1. This expression as a trapezoid can be derived from calculation based on the distortion resulting from the lens of the camera, the projection method, the mounting position of the camera, and the angle of view of the camera. As a result, because the obstacle detection ranges 2A are mapped onto coordinates on the camera image by the position mapping unit 4, the position of an obstacle acquired by the distance sensors 2 is expressed as the coordinates of the corresponding position on the imaging screen (on the camera image) when the obstacle is existing in the portion of the obstacle detection ranges 2A which is included in the image capture range 3A1, or is expressed as a position outside the image capture range when the obstacle is existing in the portion which is not included in the image capture range 3A1. Therefore, the position of the obstacle can be expressed as the coordinates on the captured image in a unified way. Although not illustrated, the position mapping of the image range on which the image transformation has been carried out onto the obstacle detection ranges 2A can also be carried out in the same way as that shown in FIGS. 4 and 5.

The positional relationship between the obstacle detection ranges and the image capture range, and an obstacle can be any of four possible cases shown below.

(A) A case in which no obstacle is existing in the image capture range and in the obstacle detection ranges In this case, because no obstacle can be detected by both the distance sensors 2 and the camera unit 3, the existence of an obstacle cannot be notified to the user.

(B) A case in which an obstacle is existing in the image capture range, but is not existing in the obstacle detection ranges In this case, the vehicle surroundings monitoring device can notify the existence of the obstacle to the user by presenting the camera image of the obstacle which is captured by the camera unit 3 to the user.

Figure 8:
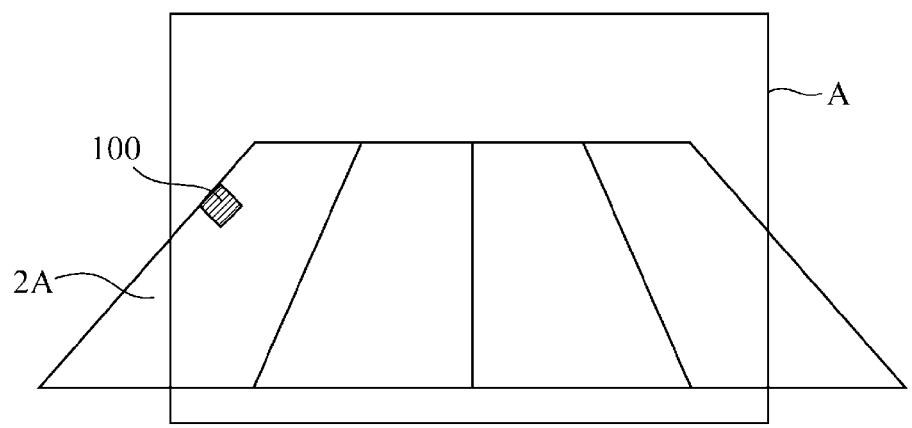
FIG. 8 is a view showing a positional relationship between the obstacle detection ranges and the image capture range, and an obstacle.
Figure 8:
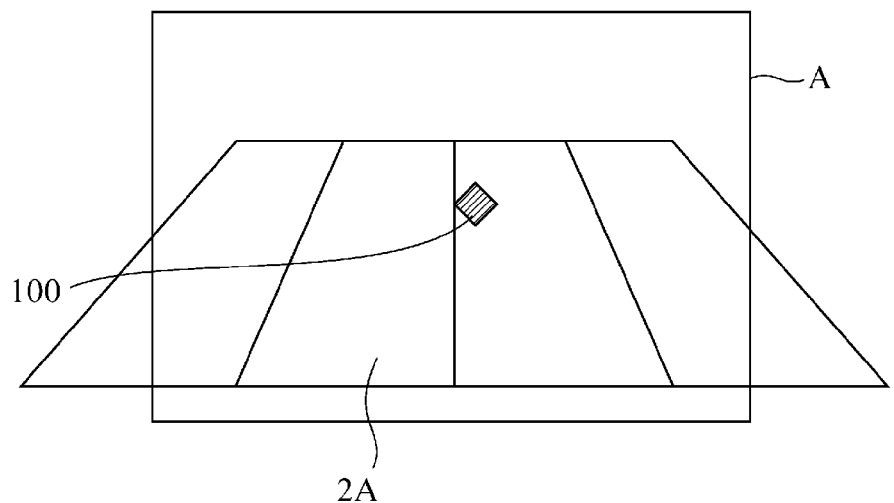

(C) A case in which an obstacle is existing both in the image capture range and in the obstacle detection ranges For example, in a case in which an obstacle 100 is existing in the image capture range A and in the obstacle detection ranges 2A, as shown in FIG. 8(*a*) and FIG. 8(*b*), by position-mapping the vector (distance and direction) of the obstacle 100 detected by the distance sensors 2 to transform the vector into coordinates in the image capture range or coordinates in the image range, the vehicle surroundings monitoring device can provide a useful image transformation method for a notification about whether or not the obstacle 100 is existing.

(D) A case in which an obstacle is existing in the obstacle detection ranges, but is not existing in the image capture range Also in this case (refer to FIG. 14 which will be mentioned below), by position-mapping the vector (distance and direction) of the obstacle 100 detected by the distance sensors 2 to transform the vector into coordinates in the image capture range or coordinates in the image range, the vehicle surroundings monitoring device can provide a useful image transformation method for a notification about whether or not the obstacle 100 is existing.

In contrast, when not using the position mapping, the vehicle surroundings monitoring device does not detect any obstacle in the above-mentioned cases (A) and (B). Further, in the case (B), the vehicle surroundings monitoring device detects an obstacle as an object in the camera image, but does not make a distinction between an obstacle in the obstacle detection ranges and an obstacle in the image capture range. In addition, in the above-mentioned cases (C) and (D), the vehicle surroundings monitoring device does not make a distinction between an obstacle in the obstacle detection ranges and an obstacle in the image capture range. To solve these problems, the vehicle surroundings monitoring device in accordance with the present invention can detect an obstacle as an object in the camera image and appropriately notify the existence of the obstacle by disposing the position mapping unit 4 for transforming the position of the obstacle in the obstacle detection ranges into coordinates on the camera image.

Next, the operation of the vehicle surroundings monitoring device will be explained. The distance sensors 2 measure the position of an obstacle from a vector (a distance and a direction), and the camera unit 3 captures an image of the image capture range. Information used for determining the image capture range of the camera unit 3 is preset to the position mapping unit 4. When receiving the result of the detection of an obstacle by the distance sensors 2, the position mapping unit 4 transforms the position of the obstacle detected by the distance sensors 2 into a coordinate position on the camera image.

When receiving the result of the position mapping by the position mapping unit 4, the mapping transformation unit 5 derives transformation parameters for image transformation in such a way that the position of the obstacle which has been transformed into the coordinates on the camera image is a predetermined position on the camera image (e.g. a central position of the screen or a position close to aside or an angle of the screen). When receiving the camera image data from the camera unit 3 and also receiving the transformation parameters from the mapping transformation unit 5, the camera image transformation unit 6 carries out an image transformation on the camera image according to the transformation parameters to output the camera image.

Figure 9:
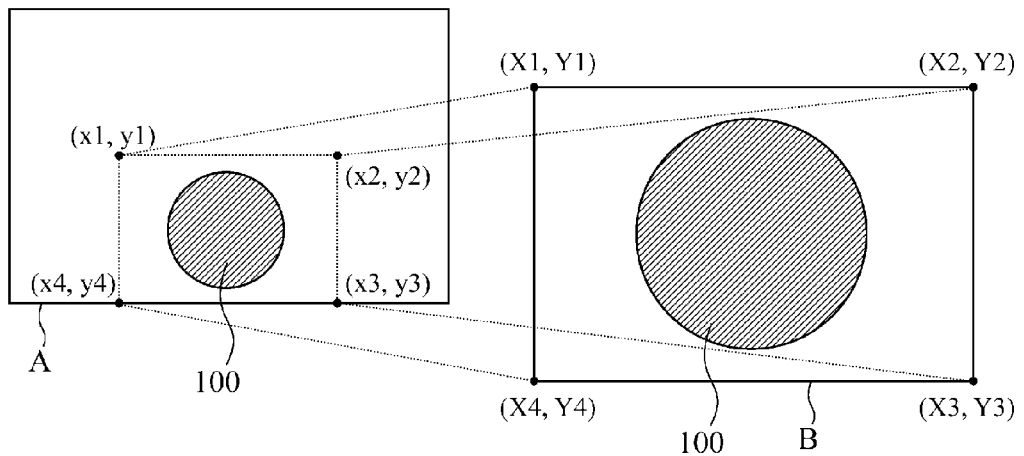
FIG. 9 is a view for explaining an image transformation process of enlarging or reducing a camera image.

Hereafter, the camera image transformation will be explained in detail. FIG. 9 is a view for explaining an image transformation process of enlarging or reducing the camera image. When enlarging the obstacle 100 and displaying the obstacle in the camera image, the mapping transformation unit 5 derives transformation parameters for transformation of a camera image A shown in FIG. 9 into a camera image B shown in FIG. 9 (enlargement of the image of the obstacle 100). In contrast with this, when reducing the obstacle 100 and displaying the obstacle in the camera image, the mapping transformation unit 5 derives transformation parameters for transformation of the camera image B shown in FIG. 9 into the camera image A shown in FIG. 9 (reduction of the image of the obstacle 100). As the transformation parameters for enlarging or reducing, the coordinates which can specify the area of a quadrilateral enclosing the obstacle in the source image (A or B), e.g. the upper left coordinates (x1, y1) and the lower right coordinates (x3, y3) among the coordinates of the opposite vertices of the quadrilateral can be specified and a scale factor of enlargement (reduction) can be set from the coordinates, and the quadrilateral enclosing the obstacle is enlarged (reduced) on a coordinate system having a size equal to the output size (X, Y) of the image output according to the transformation parameters.

Figure 10:
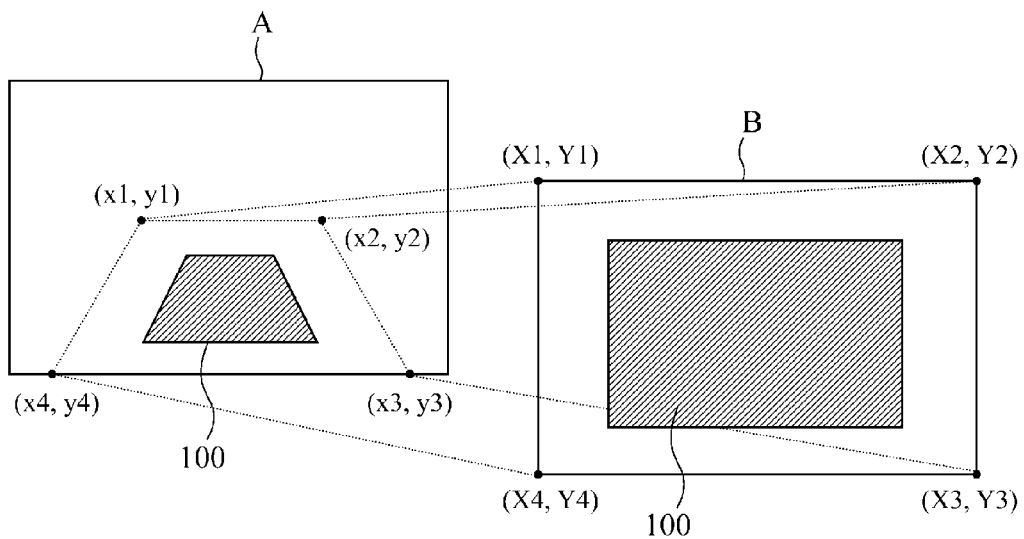
FIG. 10 is a view for explaining an image transformation process of transforming a camera image into a bird's-eye view.

FIG. 10 is a view for explaining an image transformation process of transforming the camera image into a bird's-eye view. As an example of the camera image transformation, there is an image transformation process of transforming the camera image into a bird's-eye view (a viewpoint transformation and a change of an angle of depression) as shown in FIG. 10. As transformation parameters for the image transformation process of transforming the camera image into a bird's-eye view, the coordinates which can specify a quadrilateral area enclosing a rectangular object (an obstacle 100) in the source image, e.g. the coordinates (x1, y1) of the upper left vertex of the quadrilateral, the coordinates (x2, y2) of the upper right vertex of the quadrilateral, the coordinates (x3, y3) of the lower right vertex of the quadrilateral, and the coordinates (x4, y4) of the lower left vertex of the quadrilateral can be specified, and the quadrilateral can be set up on a coordinate system having a size equal to the output size (X, Y) of the image output. By transforming the above-mentioned quadrilateral according to these transformation parameters for the bird's-eye view image transformation process, the vehicle surroundings monitoring device can provide a bird's-eye view image as shown in FIG. 10.

As an alternative, the vehicle surroundings monitoring device can change the size in an X direction of the source image in such a way that the size fits the output size X to provide a transformed image instead of a bird's-eye view image.

In addition, FIG. 10 shows an image transformation process of transforming an obstacle 100 displayed in the shape of a trapezoid in the source image A into a rectangle. As transformation parameters, the coordinates which can specify a trapezoid area enclosing an object (an obstacle 100) in the source image, e.g. the coordinates (x1, y1) of the upper left vertex of the trapezoid, the coordinates (x2, y2) of the upper right vertex of the trapezoid, the coordinates (x3, y3) of the lower right vertex of the trapezoid, and the coordinates (x4, y4) of the lower left vertex of the trapezoid can be specified, and the quadrilateral can be set up on a coordinate system having a size equal to the output size (X, Y) of the image output, like in the case of setting the transformation parameters for creation of a viewpoint transformed image. By carrying out the transformation according to these transformation parameters, the vehicle surroundings monitoring device can provide an image into which the quadrilateral is transformed, such as an image B.

Figure 11:
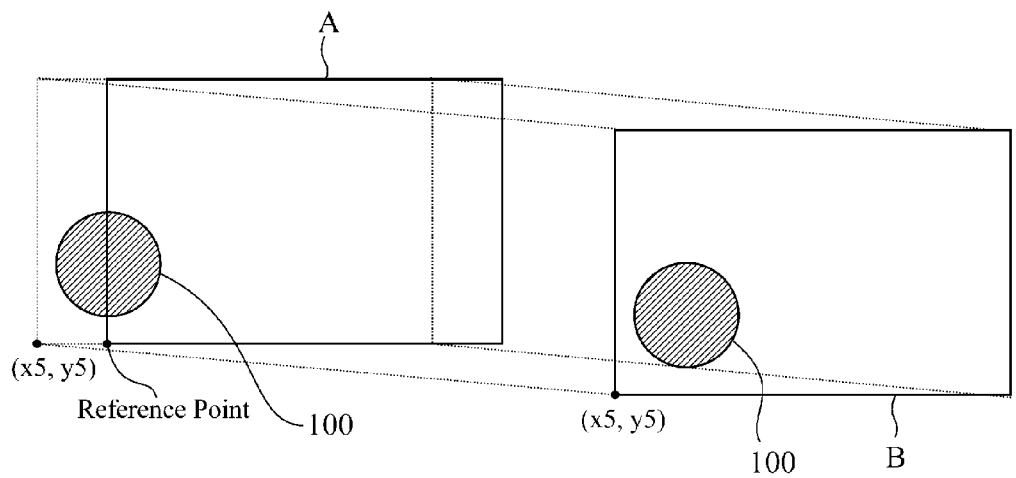
FIG. 11 is a view for explaining an image transformation process of changing a reference point of a camera image.

FIG. 11 is a view for explaining an image transformation process of changing the reference point of the camera image. The camera image transformation can be a reference point movement as shown in FIG. 11. The reference point movement is an image transformation process of moving a camera image display window with respect to the source image without any deformation of the range of the image output and the object image. A part of the source image included in the frame of the camera image display window is outputted as the camera image. When an obstacle 100 is not shown in the image outputted through the camera image display window or a part of the obstacle is shown in the image outputted through the camera image display window while the obstacle 100 is shown in the source image A, the vehicle surroundings monitoring device changes the position of the camera image display window to output a range in which the obstacle 100 is shown as an image. As transformation parameters for the reference point movement, the coordinates (x5, y5) of a reference point at which the object is shown can be specified with respect to the reference point (0, 0) of the source image, and an image output, such as an image B, is acquired by carrying out a reference point movement according to these transformation parameters. The vehicle surroundings monitoring device can acquire a transformed image by combining the above-mentioned enlarging or reducing, the above-mentioned bird's-eye view image transformation, and the above-mentioned reference point movement.

Figure 12:
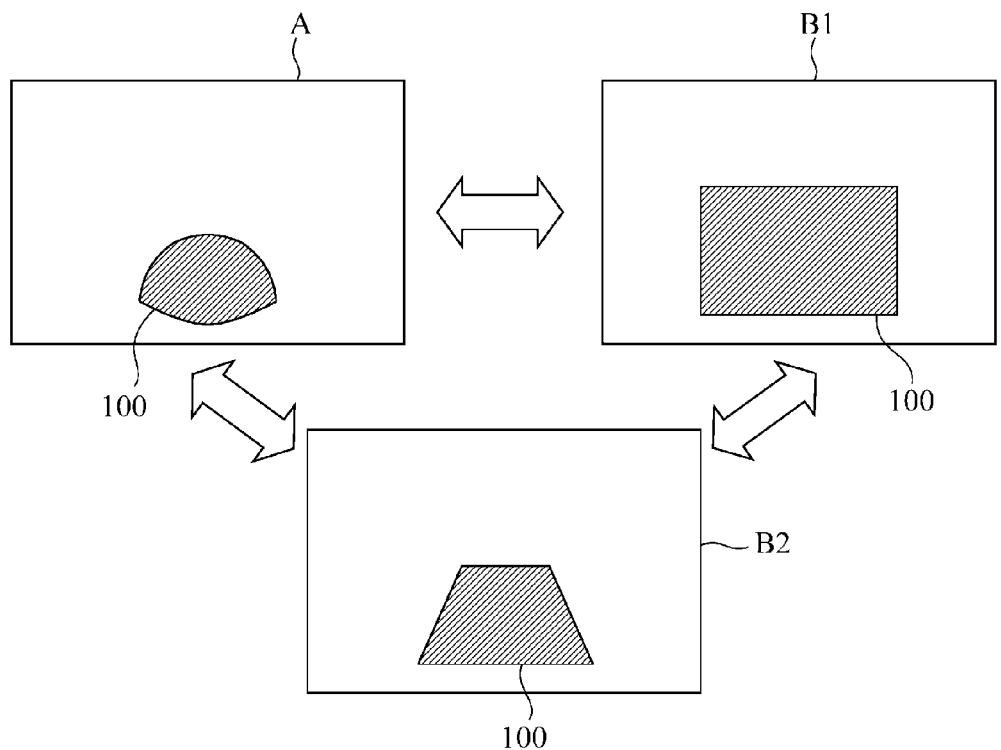
FIG. 12 is a view for explaining an image transformation in a screen mode for distortion correction, and an image transformation in a screen mode for a bird's-eye view image transformation.

FIG. 12 is a view for explaining an image transformation in a screen mode for distortion correction, and an image transformation in a screen mode for bird's-eye view image transformation, and shows a transition among screen modes. The camera image transformation can be switching among screen modes as shown in FIG. 12. As the screen modes, a screen mode in which a screen A on which the captured image itself is displayed is produced, a screen mode in which a screen B1 on which correction of distortion resulting from the camera is produced, and a screen mode in which a bird's-eye view screen B2 is produced are prepared. More specifically, because a fish-eye lens is used as the lens of the camera of the camera unit 3, the obstacle 100 is displayed on the screen A while being distorted. A screen mode ID for specifying this screen mode is set to, for example, "1". The vehicle surroundings monitoring device makes a correction to the distortion occurring in the image displayed on the screen A and resulting from the camera to correct the distortion occurring in the shape of the obstacle 100 as shown in the screen mode in which the screen B1 is displayed. A screen mode ID for specifying this screen mode is set to, for example, "2". The vehicle surroundings monitoring device carries out the bird's-eye view image transformation on the screen A or the screen B1 to switch to the screen mode in which the screen B2 is displayed. A screen mode ID for specifying this screen mode is set to, for example, "3". When a predetermined range of the position mapping is displayed, the vehicle surroundings monitoring device makes a transition among the screen modes by specifying a screen mode ID.

As mentioned above, the vehicle surroundings monitoring device in accordance with this Embodiment 1 carries out the position mapping process of expressing a positional relationship in the detection ranges of the distance sensors 2 each for detecting an obstacle 100 by coordinates on a camera image captured by the camera unit 3 having an image capture range in the surroundings of a vehicle, derives transformation parameters used for carrying out a mapping transformation in such a way that the obstacle detected by the distance sensors 2 is placed at a predetermined position on the camera image on which the position mapping process has been carried out, and carries out an image transformation on the camera image by using the transformation parameters in such a way that the obstacle is placed at the predetermined position. By doing in this way, the vehicle surroundings monitoring device provides an advantage of being able to provide a camera image which makes it easy for the user to keep track of an obstacle.

Embodiment 2

Figure 13:
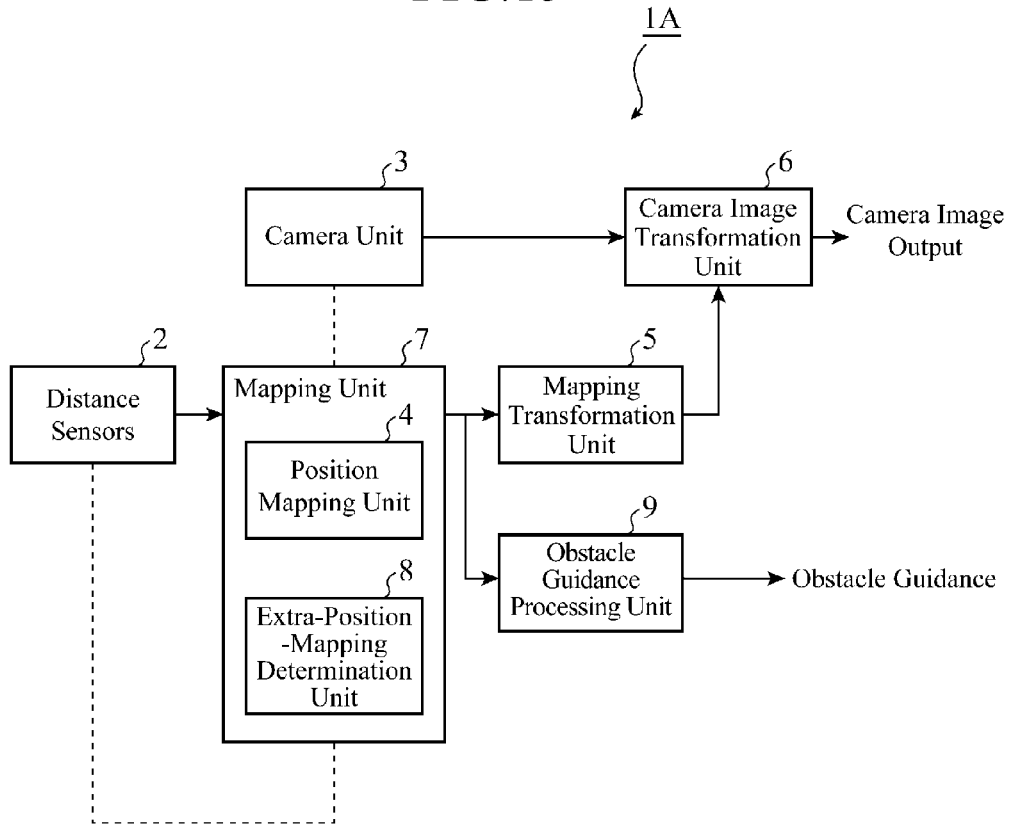
FIG. 13 is a block diagram schematically showing the structure of a vehicle surroundings monitoring device in accordance with Embodiment 2 of the present invention.

FIG. 13 is a block diagram schematically showing the structure of a vehicle surroundings monitoring device in accordance with Embodiment 2 of the present invention. Referring to FIG. 13, the vehicle surroundings monitoring device 1A in accordance with Embodiment 2 is provided with a mapping unit 7 including a position mapping unit 4 and an extra-position-mapping determination unit 8, and an obstacle guidance processing unit 9, in addition to distance sensors 2, a camera unit 3, a mapping transformation unit 5, and a camera image transformation unit 6. In Embodiment 2, it is assumed that there can occur a case in which the camera unit 3 has a narrower image capture range than the obstacle detection ranges of the distance sensors 2, and a part of the obstacle detection ranges is not included in a camera image.

The position mapping unit 4 of the mapping unit 7 transforms the position (vector) of an obstacle detected by the distance sensors 2 into coordinates on the camera image, like that in accordance with above-mentioned Embodiment 1. The extra-position-mapping determination unit 8 examines the result of the process carried out by the position mapping unit 4 to determine whether or not the position of the obstacle falls within the image capture range (falls within positions mapped). At this time, when determining that the obstacle is existing outside the image capture range, the extra-position-mapping determination unit 8 notifies the obstacle guidance processing unit 9 to that effect. When receiving the above-mentioned notification from the extra-position-mapping determination unit 8, the obstacle guidance processing unit 9 notifies the user that no obstacle is existing in the camera image. The obstacle guidance processing unit makes this notification by displaying a predetermined mark on the on-screen camera image or by voice. As a result, even when an obstacle detected by the distance sensors 2 is not existing in the camera image, the vehicle surroundings monitoring device can make a notification about whether or not the obstacle is existing, thereby being able to contribute safety.

Figure 14:
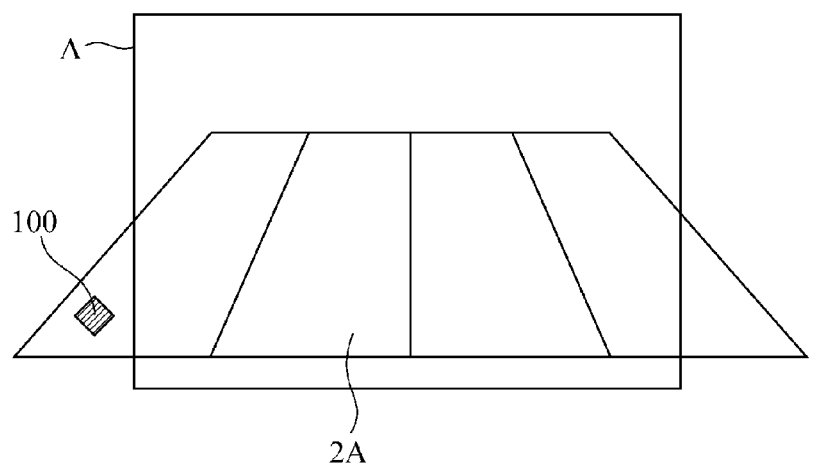
FIG. 14 is a view showing a case in which no obstacle is existing in the image capture range, but an obstacle is existing in the obstacle detection ranges.

FIG. 14 is a view showing a case in which no obstacle is existing in the image capture range, but an obstacle is existing in the obstacle detection ranges. When an obstacle 100 is existing in the obstacle detection ranges 2A, but is outside the image capture range, i.e. the screen A on which the camera image is displayed, as shown in FIG. 14, the extra-position-mapping determination unit 8 determines that the obstacle 100 is existing outside the image capture range, and the obstacle guidance processing unit 9 notifies the user that the obstacle 100 is not existing on the screen A on which the camera image is displayed.

Figure 15:
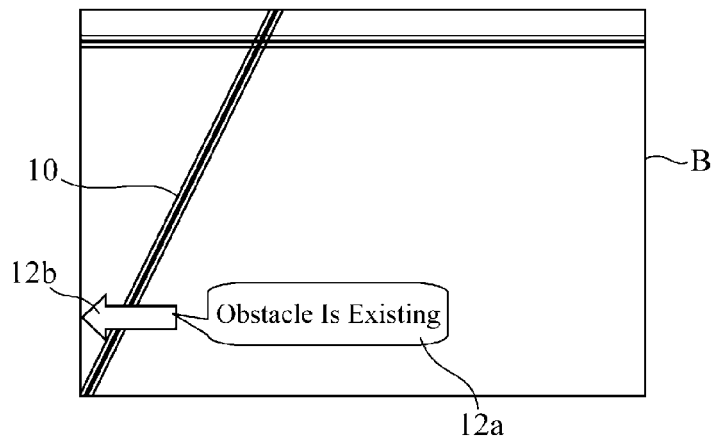
FIG. 15 is a view showing an example of a notification in a case in which no obstacle is existing in the image capture range.

FIG. 15 is a view showing an example of a notification in a case in which no obstacle is existing in the image capture range, and shows a display screen B which is presented to the user. When an obstacle is existing in the obstacle detection ranges, but is not existing in the image capture range (on the screen B), the obstacle guidance processing unit 9 makes a voice notification 12a such as "An obstacle is existing", or adds information showing the obstacle (a mark 12b showing the position of the obstacle) to the screen B, as shown in FIG. 15.

As mentioned above, the vehicle surroundings monitoring device in accordance with this Embodiment 2 is provided with the extra-position-mapping determination unit 8 for determining whether or not an obstacle 100 is existing in the camera image on which the position mapping has been carried out by the position mapping unit 4, and the guidance processing unit 9 for providing guidance showing that no obstacle 100 is existing in the camera image when the extra-position-mapping determination unit 8 determines that no obstacle 100 is existing in the camera image. Therefore, even when an obstacle detected by the distance sensors 2 is not existing in the camera image, the vehicle surroundings monitoring device can make a notification about whether or not the obstacle is existing, thereby being able to contribute safety.

Embodiment 3

Figure 16:
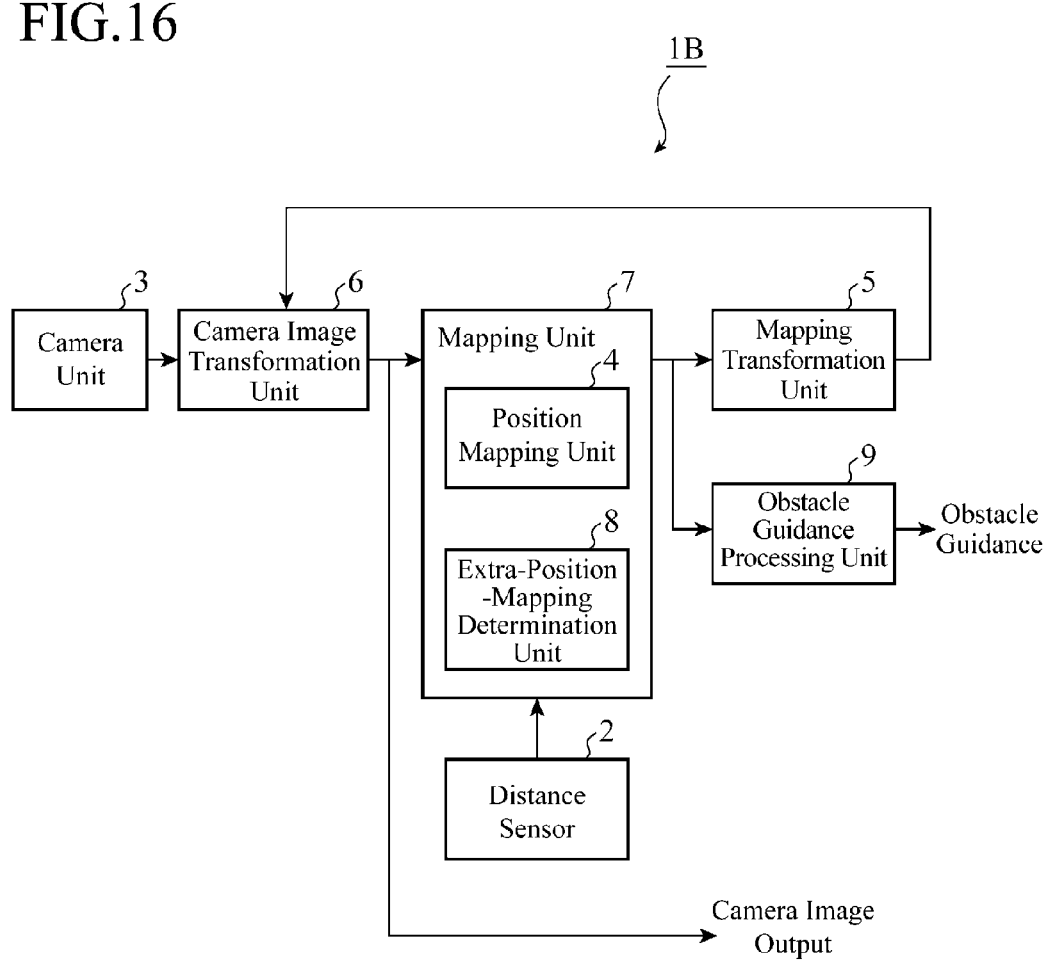
FIG. 16 is a block diagram schematically showing the structure of a vehicle surroundings monitoring device in accordance with Embodiment 3 of the present invention.

FIG. 16 is a block diagram schematically showing the structure of a vehicle surroundings monitoring device in accordance with Embodiment 3 of the present invention. Referring to FIG. 16, although the vehicle surroundings monitoring device 1B in accordance with Embodiment 3 has the same components as those in accordance with above-mentioned Embodiment 2, the vehicle surroundings monitoring device in accordance with Embodiment 3 differs from that in accordance with Embodiment 2 in that a mapping unit 7 carries out a position mapping process of mapping the obstacle detection ranges of distance sensors 2 onto coordinates on a camera image on which an image transformation has been carried out by a camera image transformation unit 6 to determine whether or not an obstacle is existing in the screen on which the image transformation has been carried out.

A position mapping unit 4 of a mapping unit 7 transforms the position (vector) of an obstacle detected by the distance sensors 2 into coordinates on the camera image from the camera image transformation unit 6, like that in accordance with above-mentioned Embodiment 1. An extra-position-mapping determination unit 8 examines the result of the process carried out by the position mapping unit 4 to determine whether or not there is a mapping position of the obstacle. At this time, when the extra-position-mapping determination unit determines that there is a mapping position of the obstacle, a mapping transformation unit 5 derives transformation parameters used for carrying out an image transformation on the camera image in such a way that the obstacle is placed at a predetermined position on the image, and outputs the transformation parameters to the camera image transformation unit 6. As a result, the camera image transformation unit 6 performs an image transformation process of placing the obstacle at the above-mentioned predetermined position on the camera image, and outputs the transformed camera image to the mapping unit 7. The mapping unit then carries out the same process as that mentioned above on the transformed camera image.

In contrast, when there is no mapping position, the mapping transformation unit 5 derives transformation parameters used for continuously carrying out a predetermined image transformation on the camera image until a mapping position of the obstacle appears, and outputs the transformation parameters to the camera image transformation unit 6. As a result, the camera image transformation unit 6 performs an image transformation process of placing the obstacle at the above-mentioned predetermined position on the camera image, and outputs the transformed camera image to the mapping unit 7. The mapping unit then carries out the same process as that mentioned above on the transformed camera image. When no mapping position of the obstacle appears even though the image transformation has been repeatedly carried out a predetermined number of times (the image transformation reaches its limit), the extra-position-mapping determination unit 8 notifies an obstacle guidance processing unit 9 to that effect. When receiving the above-mentioned notification from the extra-position-mapping determination unit 8, the obstacle guidance processing unit 9 notifies the user that no obstacle is existing in the camera image. The obstacle guidance processing unit makes this notification by displaying a predetermined mark on the on-screen camera image or by voice.

The camera image outputted at an initial time from the camera image transformation unit 6 can be selected from the original captured image or the transformed image which had been displayed before the vehicle surroundings monitoring device was turned off the last time.

As mentioned above, in the vehicle surroundings monitoring device in accordance with this Embodiment 3, the camera image transformation unit 6 returns its output to the position mapping unit 4 to repeatedly carry out an image transformation in such a way that the obstacle detected by the distance sensors 2 is placed at the predetermined position on the camera image, and the guidance processing unit 9 provides guidance showing that no obstacle appears on the camera image when no obstacle appears on the camera image even though the camera image transformation unit 6 has repeatedly carried out the image transformation on the camera image a predetermined number of times. Because the vehicle surroundings monitoring device is constructed in this way, the vehicle surroundings monitoring device detects an obstacle in the image range in which the vehicle surroundings monitoring device notifies the detection of an obstacle to the user when detecting this obstacle in the image range. Therefore, the vehicle surroundings monitoring device provides an advantage of providing a higher degree of trackability at the time when the obstacle is existing outside the image range than that at the time of detection in the image capture range in above-mentioned Embodiments 1 and 2.

Embodiment 4

In accordance with Embodiment 4, an image superimposing unit 10 superimposes an image, such as a marker, onto the position of an obstacle shown in a camera image on which an image transformation has been carried out by a camera image transformation unit 6 according to transformation parameters from a mapping transformation unit 5.

Figure 17:
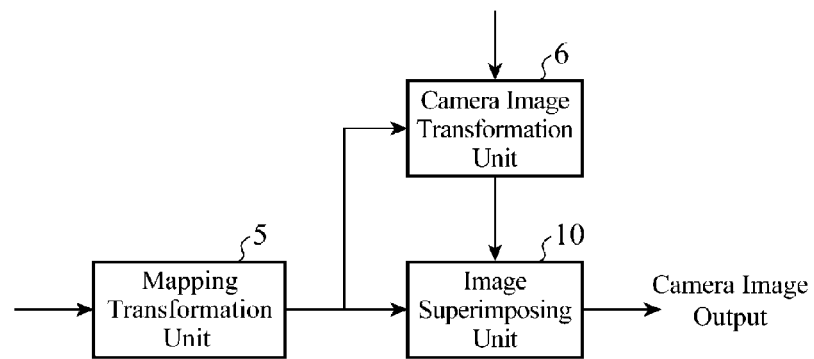
FIG. 17 is a block diagram schematically showing the structure of a vehicle surroundings monitoring device in accordance with Embodiment 4 of the present invention.

FIG. 17 is a block diagram schematically showing the structure of a vehicle surroundings monitoring device in accordance with Embodiment 4 of the present invention, and shows an example in which the structure in accordance with Embodiment 4 is applied to above-mentioned Embodiment 1. In this figure, distance sensors 2, a camera unit 3, and a position mapping unit 4 shown in FIG. 1 are omitted. Referring to FIG. 17, a mapping transformation unit 5 receives the result of position mapping from a position mapping unit 4, derives transformation parameters for image transformation in such a way that the position of an obstacle which has been transformed into coordinates on a camera image is a predetermined position on the camera image, and outputs the transformation parameters to the camera image transformation unit 6 and an image superimposing unit 10.

The camera image transformation unit 6 receives a camera image from a camera unit 3, and outputs the camera image on which the camera image transformation unit has carried out an image transformation by using the transformation parameters derived by the mapping transformation unit 5 to the image superimposing unit 10. The image superimposing unit 10 specifies the coordinates of an obstacle in the image range (the image area of the obstacle) from the image on which the image transformation has been carried out by the camera image transformation unit 6 by using the transformation parameters derived by the mapping transformation unit 5, and superimposes a preset image to be superimposed (a marker image or the like) onto this image range to acquire a camera image output.

Figure 18:
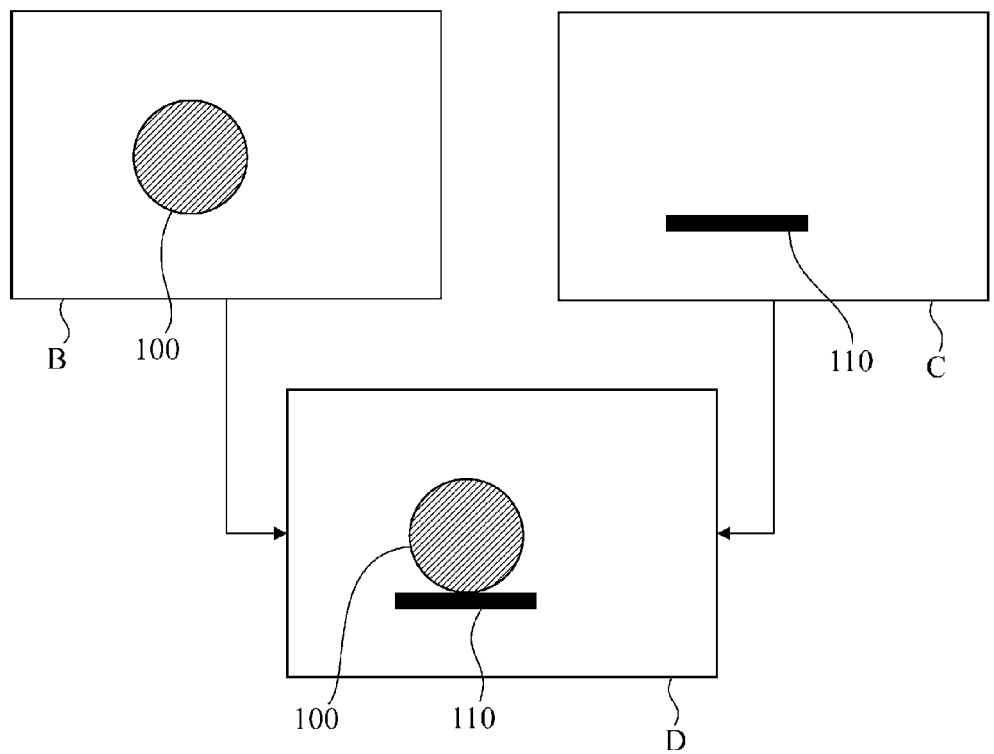
FIG. 18 is a view for explaining creation of a superimposed image by an image superimposing unit.

FIG. 18 is a view for explaining creation of the image which is to be superimposed onto the camera image by the image superimposing unit in accordance with Embodiment 4. In FIG. 18, an obstacle 100 is shown in the transformed camera image B. The coordinates of the obstacle 100 in the image range are derived through the position mapping, and are specified from the transformation parameters derived by the mapping transformation unit 5. The image superimposing unit 10 decides the coordinate position of the marker image 110 which is to be superimposed from the coordinates of the obstacle 100 in the image range to acquire an image C. Next, the image superimposing unit 10 superimposes the image C onto the camera image B to acquire an image D which is a final camera image output. As a result, the vehicle surroundings monitoring device displays the image showing the position of the obstacle with the marker to notify the user about the existence of the object, thereby guiding the user to discovery of the obstacle on the display screen.

Although in the above-mentioned explanation the case in which Embodiment 4 is applied to the structure in accordance with above-mentioned Embodiment 1 is shown, Embodiment 4 can be applied alternatively to the structure in accordance with any of above-mentioned Embodiments 2 and 3. In this case, the coordinate position of the marker image 110 to be superimposed can be decided by using the coordinates in the image range acquired by the mapping transformation unit 5 in accordance with any of above-mentioned Embodiments 2 and 3 to acquire an image C.

As mentioned above, the vehicle surroundings monitoring device in accordance with this Embodiment 4 includes the image superimposing unit 10 for superimposing an image showing the position of an obstacle onto the image on which the image transformation has been carried out by the camera image transformation unit 6. Therefore, because the vehicle surroundings monitoring device notifies the user about the position of the obstacle with the camera image on which the image, such as an marker, is superimposed, the vehicle surroundings monitoring device can guide the user to discovery of the obstacle on the display screen.

Embodiment 5

Figure 19:
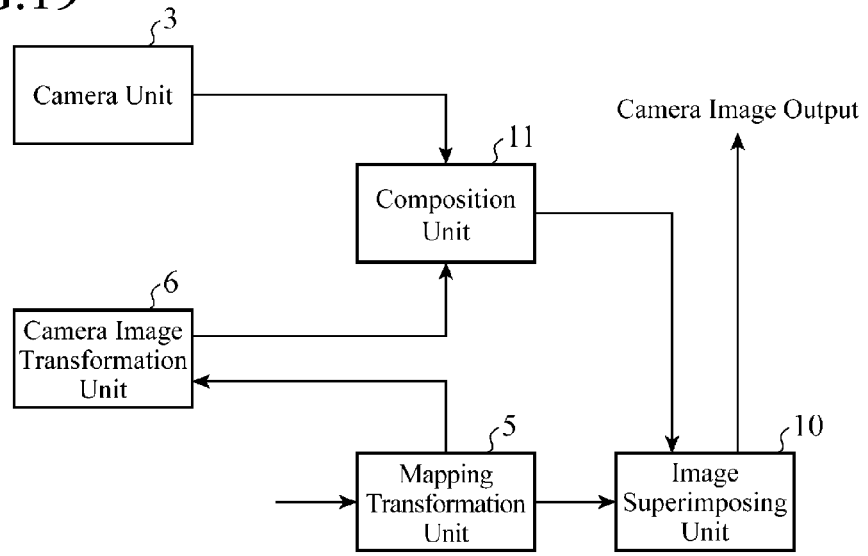
FIG. 19 is a block diagram showing main components of a vehicle surroundings monitoring device in accordance with Embodiment 5 of the present invention.

FIG. 19 is a block diagram showing main components of a vehicle surroundings monitoring device in accordance with Embodiment 5 of the present invention, and shows an example in which the structure in accordance with Embodiment 5 is applied to above-mentioned Embodiment 1. In the figure, distance sensors 2 and a position mapping unit 4 shown in FIG. 1 are omitted. A composition unit 11 shown in FIG. 19 is a component for creating a composite image in which a source image captured by a camera unit 3 (an image capture range) and a transformed image on which an image transformation has been carried out by a camera image transformation unit 6 (an image range) are arranged on an identical screen. For example, the composition unit creates an image in which the source image and the transformed image are displayed on a two-part split screen of a display unit. Further, an image superimposing unit 10 in accordance with Embodiment 5 specifies the coordinates of an image area of an obstacle in the source image (image capture range), and the coordinates of the image area of the obstacle in the transformed image (image range) from transformation parameters derived by a mapping transformation unit 5, and superimposes the image area of the obstacle in the source image and the image area of the obstacle in the transformed image onto the image capture range and the image range in the composite image acquired by the composition unit 11, respectively, to acquire a camera image output.

Figure 20:
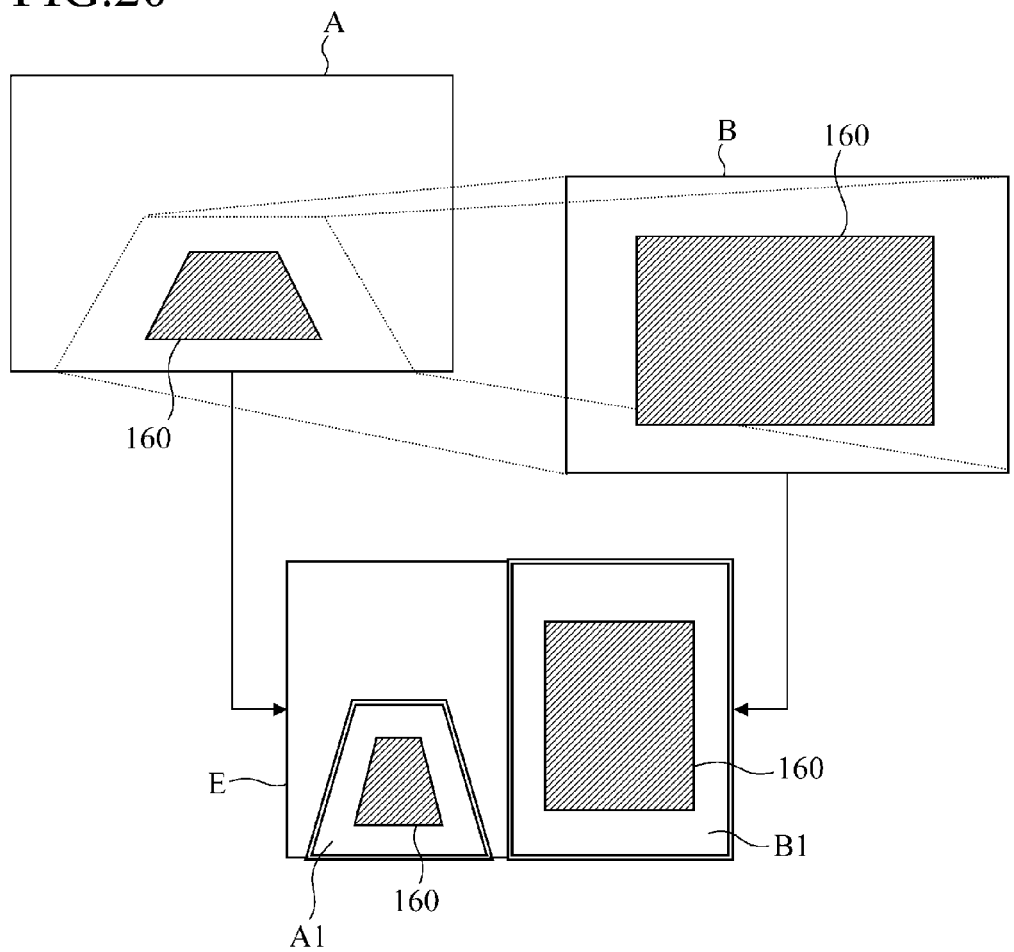
FIG. 20 is a view for explaining creation of a superimposed image by an image superimposing unit in accordance with Embodiment 5.

FIG. 20 is a view for explaining the creation of the superimposed image by the image superimposing unit of Embodiment 5. As shown in FIG. 20, an obstacle 160 is shown in an image A (image capture range) captured by the camera unit 3. An image B is the one of the image area which specifies the obstacle 160 in the image A and on which an image transformation has been carried out by the camera image transformation unit 6. The composition unit 11 composites the image A captured by the camera unit 3 and the transformed image (image range) on which the image transformation has been carried out by the camera image transformation unit 6 on an identical screen to create a composite image and outputs information about the composite image to the image superimposing unit 10.

When receiving the transformation parameters from the mapping transformation unit 5, the image superimposing unit 10 specifies the coordinates of the image area of the obstacle 160 in the image A and the coordinates of the transformed image area (transformed image B) of the obstacle 160 from the transformation parameters, decides the coordinate position of the transformed image area (transformed image B) of the obstacle 160 from the coordinates of the transformed image (image range) in the composite image, and superimposes this transformed image as an image B1 to be superimposed onto the composite image E to acquire a final camera image output.

Although in the above-mentioned explanation the case in which Embodiment 5 is applied to the structure in accordance with above-mentioned Embodiment 1 is shown, Embodiment 5 can be applied alternatively to the structure in accordance with any of above-mentioned Embodiments 2 and 3. In this case, the above-mentioned process can be carried out by using the coordinates in the image range acquired by the mapping transformation unit 5 in accordance with any of above-mentioned Embodiments 2 and 3.

As mentioned above, the vehicle surroundings monitoring device in accordance with this Embodiment 5 includes the composition unit 11 for creating an image in which both the output of the camera unit 3 and the output of the camera image transformation unit 6 are displayed on an identical screen, and the image superimposing unit 10 for superimposing both the camera image captured by the camera unit 3 and the image on which an image transformation has been carried out by the camera image transformation unit 6 onto the image created by the composition unit 11. Therefore, because the vehicle surroundings monitoring device superimposes an image area (a transformed image B) of an obstacle 160 on which the image transformation has been carried out as an image to be superimposed on the composite image to notify the user about the existence of the object, the vehicle surroundings monitoring device can assist the user to spatially keep track of a range where the obstacle 160 is existing.

Embodiment 6

Figure 21:
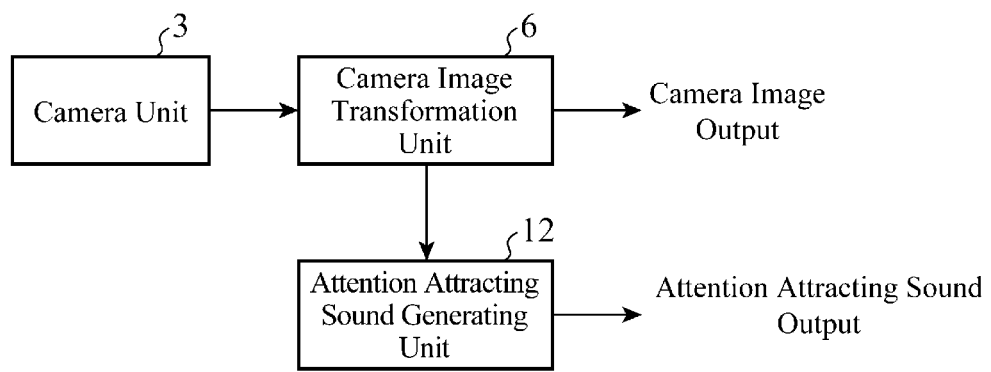
FIG. 21 is a block diagram showing main components of a vehicle surroundings monitoring device in accordance with Embodiment 6 of the present invention.

FIG. 21 is a block diagram showing main components of a vehicle surroundings monitoring device in accordance with Embodiment 6 of the present invention, and shows an example in which the structure in accordance with Embodiment 6 is applied to above-mentioned Embodiment 1. In the figure, distance sensors 2, a position mapping unit 4 and a mapping transformation unit 5 shown in FIG. 1 are omitted. In FIG. 21, an attention attracting sound generating unit 12 outputs guidance about an image transformation as an attention attracting sound when a camera image transformation unit 6 carries out an image transformation on a camera image. Because the vehicle surroundings monitoring device notifies the user that the image is going to be transformed in this way, the vehicle surroundings monitoring device makes it possible to ease the discreteness to change in the image range. Embodiment 6 can also be applied to the camera image transformation unit 6 in accordance with any of above-mentioned Embodiments 2 and 3.

Embodiment 7

Figure 22:
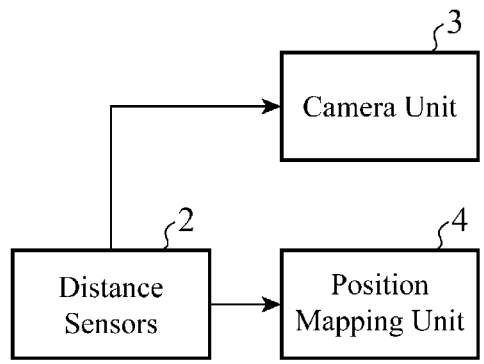
FIG. 22 is a block diagram showing main components of a vehicle surroundings monitoring device in accordance with Embodiment 7 of the present invention.

FIG. 22 is a block diagram showing main components of a vehicle surroundings monitoring device in accordance with Embodiment 7 of the present invention, and shows an example in which the structure in accordance with Embodiment 7 is applied to above-mentioned Embodiment 1. In the figure, a position mapping unit 4, a mapping transformation unit 5 and a camera image transformation unit 6 shown in FIG. 1 are omitted. A camera unit 3 shown in FIG. 22 starts when being triggered by discovery of an obstacle by distance sensors 2. Because the vehicle surroundings monitoring device is constructed in this way, when an obstacle is existing far away from the vehicle and the vehicle is safe from danger posed by the obstacle, the vehicle surroundings monitoring device does not display the camera image, whereas when an obstacle is existing in the obstacle detection ranges of the distance sensors 2, the vehicle surroundings monitoring device can contribute to the vehicle driving safety by notifying the user about the existence of the obstacle with the camera image. Embodiment 7 can also be applied to the camera unit 3 in accordance with any of above-mentioned Embodiments 2 to 5.

Embodiment 8

Figure 23:
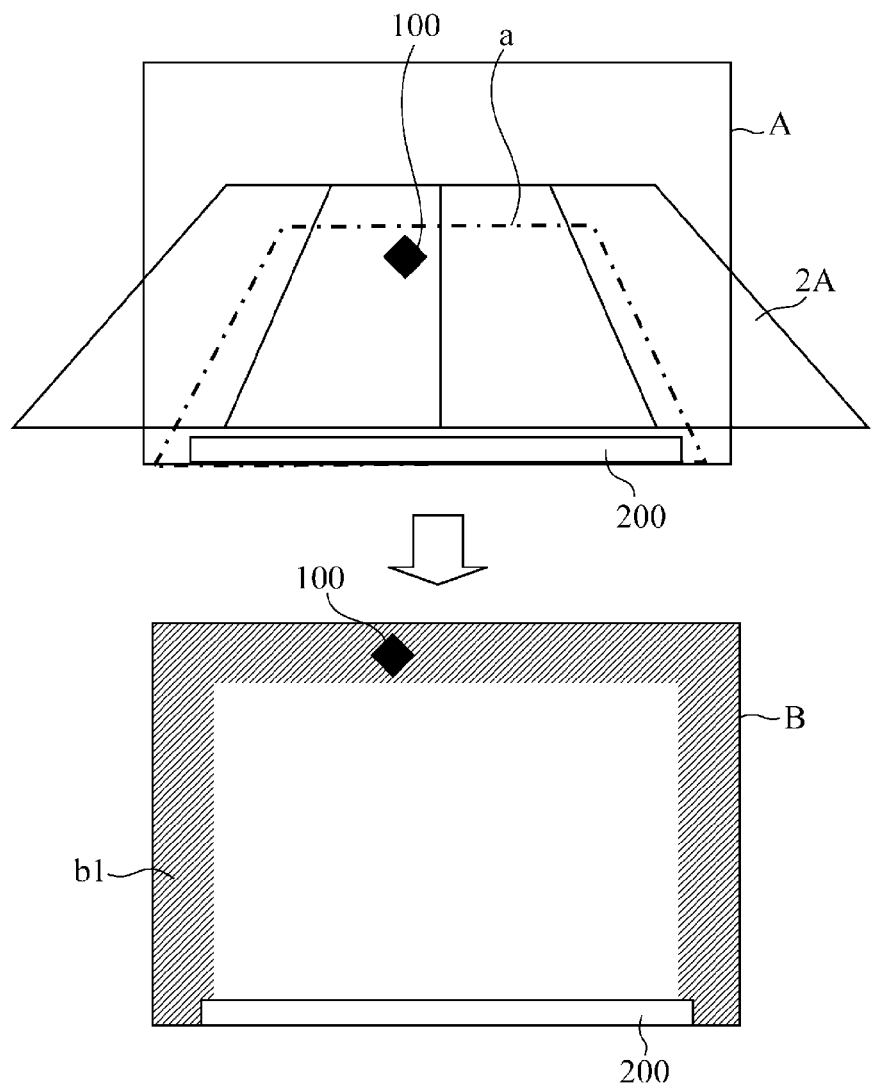
FIG. 23 is a view showing an example of a camera image display produced by a vehicle surroundings monitoring device in accordance with Embodiment 8.

FIG. 23 is a view showing an example of a camera image display produced by a vehicle surroundings monitoring device in accordance with Embodiment 8. In accordance with Embodiment 8, a mapping transformation unit 5 and a camera image transformation unit 6 carryout an image transformation in such a way that an on-screen obstacle 100 is positioned close to a left side, an upper side or a right side of an output image B. Further, a body of the vehicle 200 is positioned at a lower side of the image B. More specifically, the vehicle surroundings monitoring device carries out a mapping transformation in such a way that the position on the camera image of the obstacle 100 detected by distance sensors 2 is close to one side (the left side, the upper side or the right side) except the side (lower side) which is the closest to the vehicle 200 of the rectangular camera image on which the image transformation has been carried out. Embodiment 8 can be applied to any of above-mentioned Embodiments 1 to 7.

According to a method of defining the image transformation, when the camera image is displayed as a rectangular image, a mage transformation range a is set up on an image capture range A in such a way that the obstacle 100 exists in a range b1 close to the right side, the upper side or the left side of the transformed image B. The vehicle surroundings monitoring device then carries out the image transformation so that the obstacle 100 is always displayed at the specific position of the image B, thereby making it easy for the user to keep track of the positional relationship between the obstacle and the body of the vehicle 200.

Embodiment 9

Figure 24:
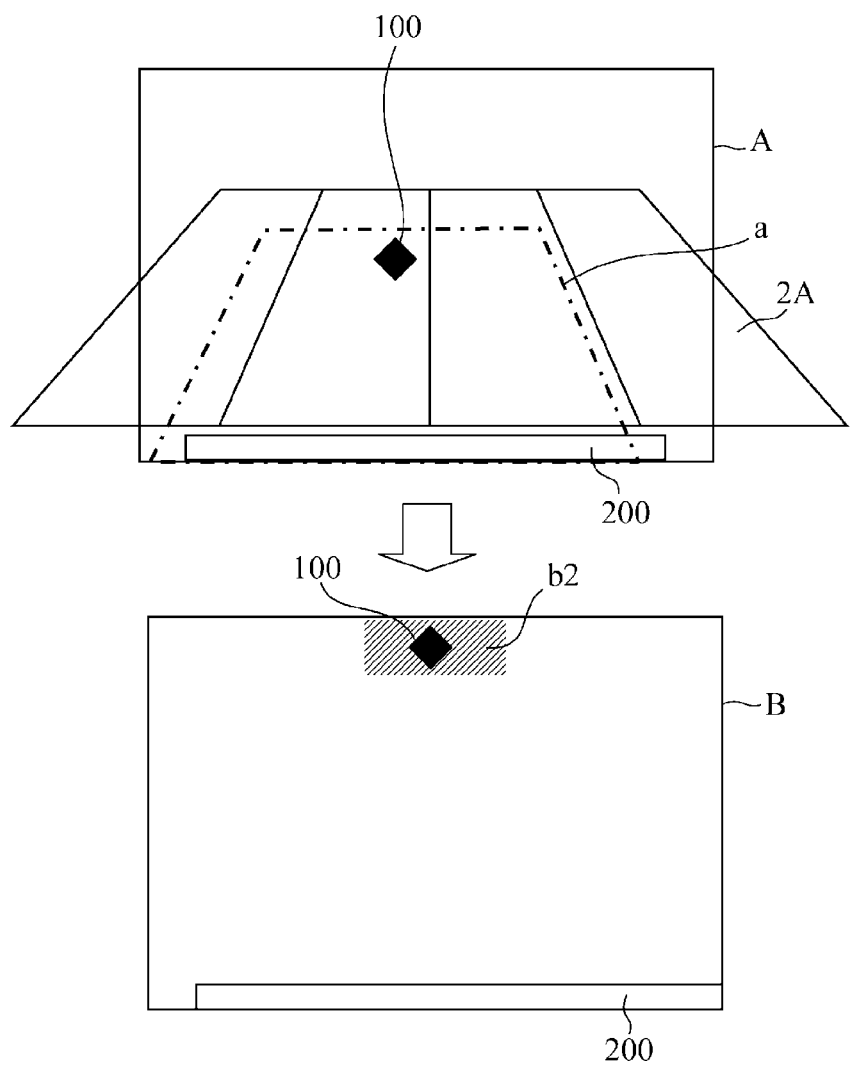
FIG. 24 is a view showing an example of a camera image display produced by a vehicle surroundings monitoring device in accordance with Embodiment 9.

FIG. 24 is a view showing an example of a camera image display produced by a vehicle surroundings monitoring device in accordance with Embodiment 9. In accordance with Embodiment 9, a mapping transformation unit 5 and a camera image transformation unit 6 carry out an image transformation in such a way that an on-screen obstacle 100 is positioned at the center of an upper side of an output image B. More specifically, the vehicle surroundings monitoring device carries out a mapping transformation in such a way that the position on the camera image of the obstacle 100 detected by distance sensors 2 is at the center of the side (the upper side) which is the furthest from the vehicle 200 in the rectangular camera image on which the image transformation has been carried out. Embodiment 9 can be applied to any of above-mentioned Embodiments 1 to 7.

According to a method of defining the image transformation, when the camera image is displayed as a rectangular image, a mage transformation range a is set up on an image capture range A in such a way that the obstacle 100 exists in a range b2 at the center of the upper side of the transformed image B. The vehicle surroundings monitoring device then carries out the image transformation so that the obstacle 100 is always displayed at the specific unique position of the image B, thereby making it easy for the user to keep track of discovery of the obstacle 100.

Embodiment 10

Figure 25:
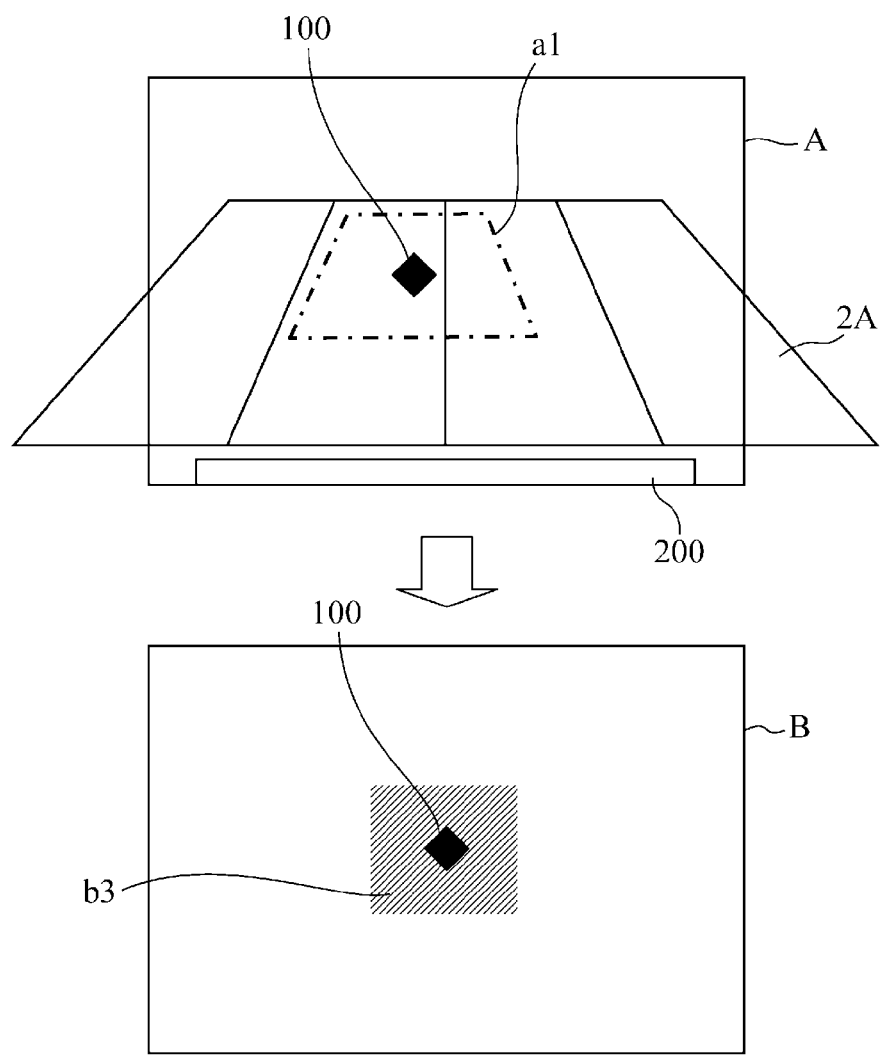
FIG. 25 is a view showing an example of a camera image display produced by a vehicle surroundings monitoring device in accordance with Embodiment 10.

FIG. 25 is a view showing an example of a camera image display produced by a vehicle surroundings monitoring device in accordance with Embodiment 10. In accordance with Embodiment 10, a mapping transformation unit 5 and a camera image transformation unit 6 carry out an image transformation in such a way that an on-screen obstacle 100 is positioned at the center of an output image B. Embodiment 10 can be applied to any of above-mentioned Embodiments 1 to 7.

According to a method of defining the image transformation, a mage transformation range al is set up on an image capture range A in such away that the obstacle 100 exists in a range b3 at the center of the transformed image B. The vehicle surroundings monitoring device then carries out the image transformation so that the obstacle 100 is always displayed at the specific unique position of the image B, thereby making it easy for the user to keep track of discovery of the obstacle 100 and the conditions of the surroundings of the obstacle.

INDUSTRIAL APPLICABILITY

Because the vehicle surroundings monitoring device in accordance with the present invention can provide a camera image which makes it easy for the user to keep track of an obstacle, the vehicle surroundings monitoring device is suitable for use in a parking support device for supporting the user in parking his or her vehicle by using a camera image which is acquired by capturing an area at the parking position behind the vehicle.

The invention claimed is:

1. A vehicle surroundings monitoring device comprising:
a position mapping unit that carries out a position mapping process of expressing a positional relationship in a detection range in surroundings of a vehicle of a distance sensor that detects an obstacle by coordinates on a camera image captured by a camera having an image capture range in said surroundings of the vehicle;
a mapping transformer that derives transformation parameters used for carrying out a mapping transformation in such a way that said obstacle detected by said distance sensor is placed at a predetermined position on said camera image on which the position mapping process has been carried out by said position mapping unit;
a camera image transformer that carries out an image transformation on said camera image by using the transformation parameters acquired by said mapping transformer in such a way that said obstacle is placed at said predetermined position;
an extra-position-mapping determination unit that determines that an obstacle is not existing in said camera image on which the position mapping process has been carried out and the obstacle is existing in the detection range by said position mapping unit; and
a guidance processor that provides guidance showing that the obstacle is existing out of said camera image based on a determination of the extra-position-mapping determination unit.

2. The vehicle surroundings monitoring device according to claim 1, wherein said camera image transformer returns its output to said position mapping unit to repeatedly carry out the image transformation on said camera image in such a way that said obstacle detected by said distance sensor is placed at said predetermined position on said camera image, and said guidance processor provides guidance showing that said obstacle does not appear on said camera image when said obstacle does not appear on the said camera image even though said camera image transformer has repeatedly carried out the image transformation on said camera image a predetermined number of times.

3. The vehicle surroundings monitoring device according to claim 1, wherein said camera image transformer carries out an image transformation process of enlarging or reducing the camera image.

4. The vehicle surroundings monitoring device according to claim 1, wherein said camera image transformer carries out an image transformation process of transforming the camera image into a bird's-eye view.

5. The vehicle surroundings monitoring device according to claim 1, wherein said camera image transformer carries out an image transformation process of changing a reference point of the camera image.

6. The vehicle surroundings monitoring device according to claim 1, wherein said camera image transformer carries out the image transformation while switching between a screen mode in which to correct distortion of said camera image and a screen mode in which to carry out an image transformation process of transforming the camera image into a bird's-eye view.

7. The vehicle surroundings monitoring device according to claim 1, wherein when said camera image is displayed as a rectangular image, said mapping transformer carries out the mapping transformation in such a way that the obstacle detected by said distance sensor is placed at a position close to one of sides of said rectangular image except a side nearest to the vehicle.

8. The vehicle surroundings monitoring device according to claim 1, wherein when said camera image is displayed as a rectangular image, said mapping transformer carries out the mapping transformation in such a way that the obstacle detected by said distance sensor is placed at a center of a side of said rectangular image which is furthest from the vehicle.

9. The vehicle surroundings monitoring device according to claim 1, wherein said mapping transformer carries out the mapping transformation in such a way that the obstacle detected by said distance sensor is placed at a center of said camera image.

10. The vehicle surroundings monitoring device according to claim 1, wherein said vehicle surroundings monitoring device includes an image superimposer that superimposes an image showing the position of the obstacle on the image on which the image transformation has been carried out by said camera image transformer.

11. The vehicle surroundings monitoring device according to claim 1, wherein said vehicle surroundings monitoring device includes a compositor that creates an image in which both an output of said camera and an output of said camera image transformer are displayed on an identical screen, and an image superimposer that superimposes both the camera image captured by said camera and the image on which the image transformation has been carried out by said camera image transformer on the image created by said compositor.

12. The vehicle surroundings monitoring device according to claim 1, wherein said vehicle surroundings monitoring device includes an attention attracting sound generator that provides guidance about the image transformation by voice when said camera image transformer carries out the image transformation.

13. The vehicle surroundings monitoring device according to claim 1, wherein said guidance processor superimposes an image showing that said obstacle does is not existing on said camera image on which the image transformation has been carried out by said camera image transformer to notify to that effect.

14. The vehicle surroundings monitoring device according to claim 1, wherein said guidance processor notifies that said obstacle is not existing on said camera image by guiding voice.

15. The vehicle surroundings monitoring device according to claim 1, wherein said camera unit starts a capturing operation when being triggered by detection of an obstacle by said distance sensor.

16. The vehicle surroundings monitoring device according to claim 1, wherein the position mapping process includes transforming a position vector of a detected obstacle into coordinates on the camera image captured by the camera.

* * * * *